(12) United States Patent
Holton

(10) Patent No.: US 6,189,802 B1
(45) Date of Patent: Feb. 20, 2001

(54) LAWN AND GARDEN SPREADER FOR PELLETIZED MULCHES AND THE LIKE

(76) Inventor: Charles J. Holton, 16801 Peacock Rd., Haslett, MI (US) 48840

( * ) Notice: Under 35 U.S.C. 154(b), the term of this patent shall be extended for 0 days.

(21) Appl. No.: 09/280,301

(22) Filed: Mar. 29, 1999

(51) Int. Cl.[7] .................................................... B05B 17/00
(52) U.S. Cl. .............................. 239/1; 239/687; 222/625
(58) Field of Search .................................... 239/681, 687, 239/688, 650, 661, 664, 665, 666, 1; 222/624, 625, 608, 559; 414/519, 439, 440

(56) References Cited

U.S. PATENT DOCUMENTS

| | | | |
|---|---|---|---|
| 3,907,212 | * | 9/1975 | Ullom ................................... 222/625 |
| 4,106,704 | * | 8/1978 | McRoskey et al. .................. 239/687 |
| 4,487,370 | * | 12/1984 | Speicher ................................. 239/687 |

\* cited by examiner

*Primary Examiner*—Lisa Ann Douglas
(74) *Attorney, Agent, or Firm*—Price Heneveld Cooper DeWitt & Litton

(57) ABSTRACT

A lawn and garden spreader is adapted for efficiently spreading pelletized mulches and other like applications larger in size than that typically associated with lawn and garden applications. The spreader includes a gravity flow hopper having an outlet aperture in lower portion thereof, and a horizontally oriented track disposed adjacent to the outlet aperture. A rotatable disbursement blade is situated below the outlet aperture such that an application flowing through the aperture will contact the disbursement blade. A gate is slidably mounted within the track such that the gate may be shifted between an extended position wherein the gate closes the outlet aperture and a retracted position wherein the outlet aperture is open. A metering door is pivotably attached to the hopper such that the metering door may be rotated between a raised position wherein the door covers the aperture, and an open position wherein the door is lowered and meters the application flowing through the aperture and onto the disbursement blade. A mechanical linkage is operably connected with the gate and the door and allows the operator to selectively operate the gate between the extended and retracted positions and the door between the closed and open positions. The gate and door may be operated in combination so as to allow the application to flow freely through the aperture while allowing the operator to selectively meter the flow of the application by way of the door.

32 Claims, 3 Drawing Sheets

LAWN AND GARDEN SPREADER FOR PELLETIZED MULCHES AND THE LIKE

BACKGROUND OF THE INVENTION

The present invention relates to a lawn and garden spreader, and in particular to a lawn and garden spreader adapted to efficiently spread pelletized mulches, fertilizers, and other oversized applications.

Lawn and garden spreaders are used to spread and disperse a wide variety of lawn and garden applications. The spreaders typically include a hopper, an aperture located in the bottom of the hopper, a gate for opening and closing the aperture, a disbursement blade for spreading the application, and a mechanism for opening and closing the gate.

Heretofore, lawn and garden spreaders have normally incorporated a single gate to open and close the aperture. Typically, these spreaders allow the operator to adjust the gate between the fully open and fully closed positions only. As a result, the size of the apertures are calibrated so as to allow the operator to spread only a single type of application with any given spreader. Other systems, allow the operator to adjust the gate between a plurality of positions thereby allowing the operator to adjust the size of the aperture for the given application. However, current spreaders are typically not designed to provide adequate flow and metering of new pellet fertilizers, mulches and other similar large applications. Many new pelletized mulches and fertilizers are much larger than those typically utilized in the industry for many years and measure from ¼ of an inch up to and including 1 inch in any direction. With most spreaders, opening the gate to a position such that these oversized applications can sufficiently flow through the aperture results in an un-metered flow. At the other extreme, restricting the aperture to meter the flow results in clogging and intermittent flow of the application through the aperture.

Another problem associated with most lawn and garden spreaders adapted to spread various sized applications is that they are complicated to operate and require the operator to consult charts and graphs in order to determine what setting is appropriate for a given application. Still others provide no help at all requiring the operator to rely on trial and error in an attempt to configure the spreader appropriately for each application.

SUMMARY OF THE INVENTION

One aspect of the present invention is to provide a lawn and garden spreader that is adapted for efficiently spreading pelletized mulches and other like applications larger in size than granular products are typically associated with lawn and garden applications. The spreader includes a gravity flow hopper having an outlet aperture in a lower portion thereof, and a horizontally oriented track disposed adjacent to the outlet aperture. A rotatable disbursement blade is situated below the outlet aperture such that an application flowing through the aperture will contact the disbursement blade. A gate is slidably mounted within the track such that the gate may be shifted between an extended position wherein the gate closes the outlet aperture and a retracted position wherein the outlet aperture is open. A metering door is pivotably attached to the hopper such that the metering door may be rotated between a raised position wherein the door covers the aperture, and an open position wherein the door is lowered and meters the application flowing through the aperture and onto the disbursement blade. A mechanical linkage is operatively connected with the gate and the door thereby allowing the operator to selectively operate the gate between the extended and retracted positions, and the door between the closed and open positions.

Another aspect of the present invention is to provide a method for metering and spreading pelletized mulches and the like applications that are larger in size then granular products typically associated with lawn and garden applications. The method includes providing a gravity flow hopper having an outlet aperture formed in a lower portion thereof and a horizontally oriented track disposed adjacent to the outlet aperture, providing a rotatable disbursement blade situated below the aperture, providing a gate slidably mounted in the track and shiftable between an extended position wherein the gate closes the outlet aperture and a retracted position wherein the outlet aperture is open, and providing a metering door pivotally attached to the hopper for rotation between a closed position wherein the door is raised and covers the aperture and an open position wherein the door is lowered. The method further includes providing a first mechanical linkage operatively connected with the gate thereby allowing the operator to selectively operate the gate between the extended and the retracted positions, and providing a second mechanical linkage operatively connected with the door thereby allowing the operator to selectively operate the door between the closed and open positions and a plurality of intermediate selectable positions therebetween and calibrated so as to provide a predetermined flow rate of an application contained in the hopper through the aperture and onto the disbursement blade. The method still further includes placing the appropriate application within the hopper, operating the gate in cooperation with the door such that even and uninterrupted flow of the application from the hopper through the aperture is achieved, and adjusting the door such that the application flows through the aperture in and onto the disbursement blade at a specific rate.

The principal objects of the present invention are to provide a lawn and garden spreader adapted for effectively spreading pelletized mulches, and other similar applications larger in size than granular products typically associated with lawn and garden applications. The utilization of a sliding gate in combination with a pivoting door system allows the operator to sufficiently open the aperture associated with the hopper such that the application contained in the hopper freely flows through the aperture, yet allows the operator to meter the flow of the application onto the disbursement blade by way of the pivoting door system. A further object of the present invention is to provide a metering system that is easy to operate and adjust with respect to the appropriate flow rate for a given application.

These and other features, advantages, and objects of the present invention will be further understood and appreciated by those skilled in the art by reference to the following specification, claims, and appended drawings.

DETAILED DESCRIPTION OF THE PREFERRED EMBODIMENTS

For purposes of description herein, the terms "upper," "lower," "right," "left," "rear," "front," "vertical," "horizontal," and derivatives thereof shall relate to the invention as oriented such that the operator stands at the "rear" of the invention when using the invention. However, it is to be understood that the invention may assume various alternative orientations and step sequences, except where expressly specified to the contrary. It is also to be understood that the specific devices and processes illustrated in the attached drawings and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 1:
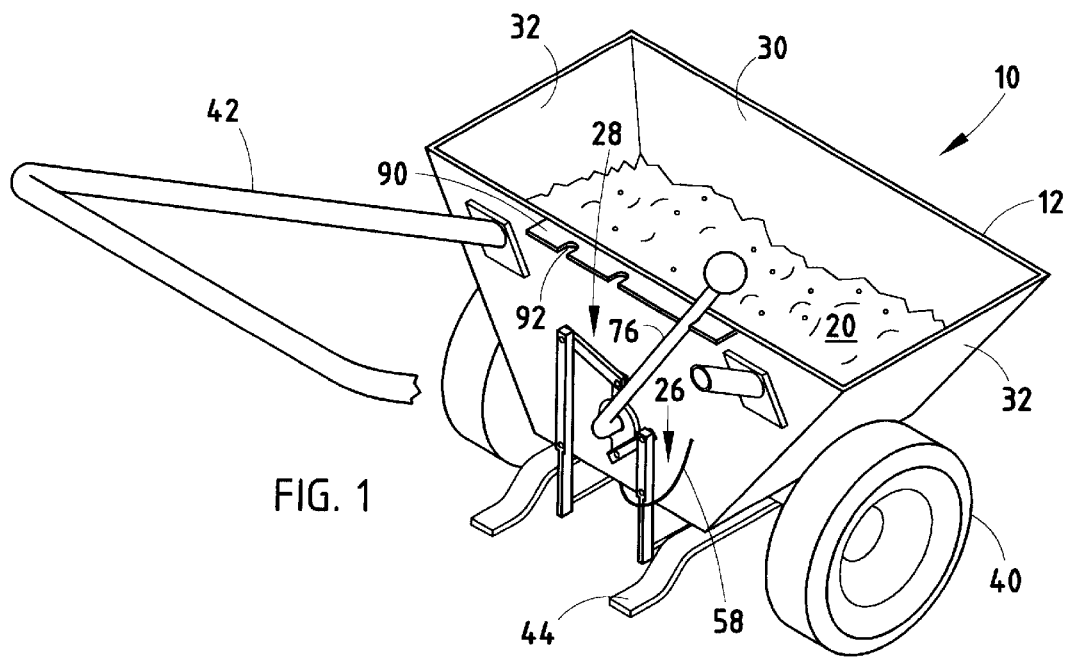
FIG. 1 is a prospective view of a lawn and garden spreader embodying the present invention.

The reference numeral 10 (FIGS. 1 and 2) generally designates a lawn and garden spreader embodying the present invention. In the illustrated example, the spreader 10 includes a gravity flow hopper 12 having an outlet aperture 14 located in a lower portion thereof, and a horizontally oriented track 16 disposed adjacent to aperture 14. A rotatable disbursement blade 18 (FIG. 3) is situated below aperture 14 such that an application 20 flowing through aperture 14 will contact blade 18. A gate 22 is slidably mounted within track 16 such that gate 22 may be shifted between an extended position wherein gate 22 closes aperture 14 and a retracted position wherein aperture 14 is open. A metering door 24 is pivotally attached to hopper 12 such that door 24 may be rotated between a raised position wherein door 24 covers aperture 14, and an open position wherein door 24 is lowered and meters the application 20 flowing through aperture 14 and onto blade 18. A first mechanical linkage 26 is operatively connected with gate 22 allowing the operator to selectively operate gate 22 between the extended and retracted positions. A second mechanical linkage 28 is operatively connected with door 24 allowing the operator to selectively operate door 24 between the closed and open positions. Gate 22 and door 24 may be operated in combination so as to allow the application 20 to flow freely through aperture 14 while allowing the operator to selectively meter the flow of the application 20 by way of door 24.

The illustrated hopper 12 (FIGS. 1, 2 and 3) is defined by a rearwardly sloping front wall 30, inwardly sloping side walls 32, an outer rear wall 34, an inwardly sloping inner rear wall 36, and a bottom wall 38. Aperture 14 is substantially centrally located within bottom wall 38. Front wall 30, side wall 32, and inner rear wall 36 slope inwardly towards aperture 14 thereby providing a gravity flow to the application 20 located in hopper 12. Aperture 14 is provided with a substantially rectangular shape, however, other geometrical shapes may be employed. Aperture 14 measures approximately 3 inches in width and 4 inches in length, thereby providing adequate area for application 20 to exit hopper 12 via aperture 14 notwithstanding that application 20 may be provided in a size much larger than that typically associated with lawn and garden applications which is discussed in greater detail below. It should be noted that aperture 14 may be provided in various sizes depending on the range of sizes of application 20 spreader 10 is designed to accommodate. Outer rear wall 34 of hopper 12 is provided with a pivot aperture 35 centrally located therein. Track 16 comprises two L-shaped track members 39a and 39b, attached to and extending downwardly from bottom wall 38 of hopper 12, and a guide member 41, also attached to and extending downwardly from bottom wall 38 of hopper 12. Track members 39a and 39b are adapted so as to guide and support gate 22 between the open and closed postions. Guide member 41 is adapted so as to provide a pocket 37 between guide member 41 and bottom wall 38 of hopper 12.

Illustrated spreader 10 is rollably supported by a wheel system 40 that allows the operator to roll spreader 10 across a lawn, garden, or other area. Spreader 10 is further provided with a rearwardly extending push handle 42 that allows the operator to manipulate the spreader 10 on wheel system 40. Spreader 10 is still further provided with a pair of support legs 44 that extend downwardly and rearwardly from hopper 12 and allow the operator to store the spreader 10 in an upright position when not in use.

Figure 3:
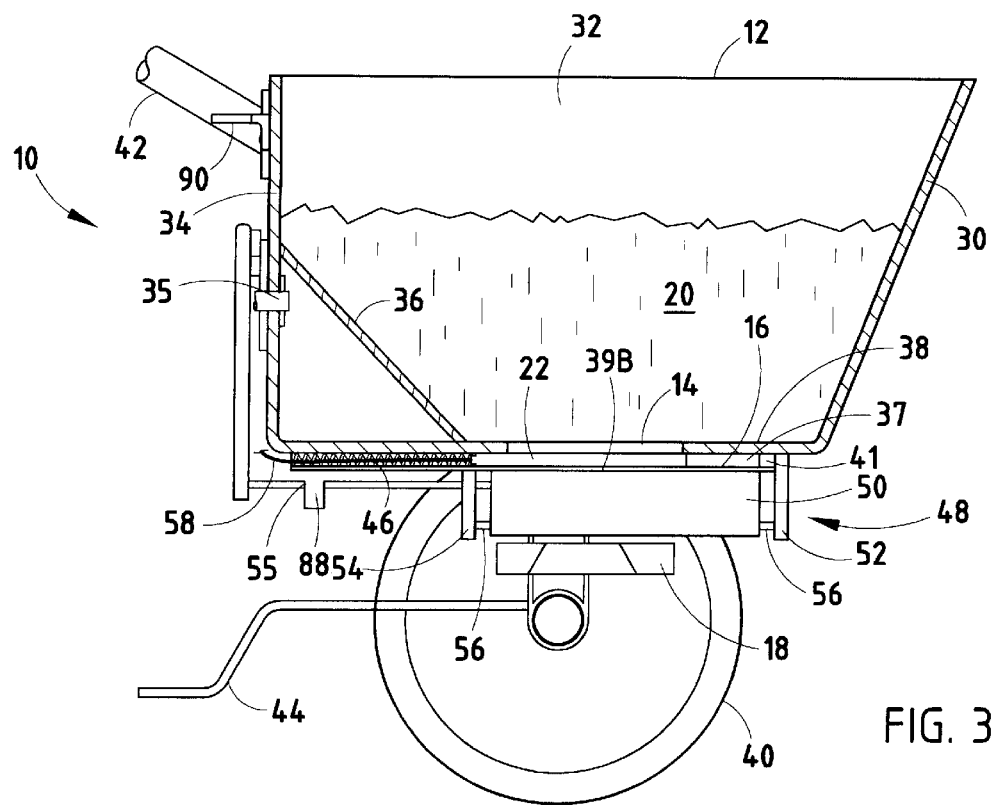
FIG. 3 is a cross-sectional view of the lawn and garden spreader, taken along line III—III, FIG. 2.
Figure 4:
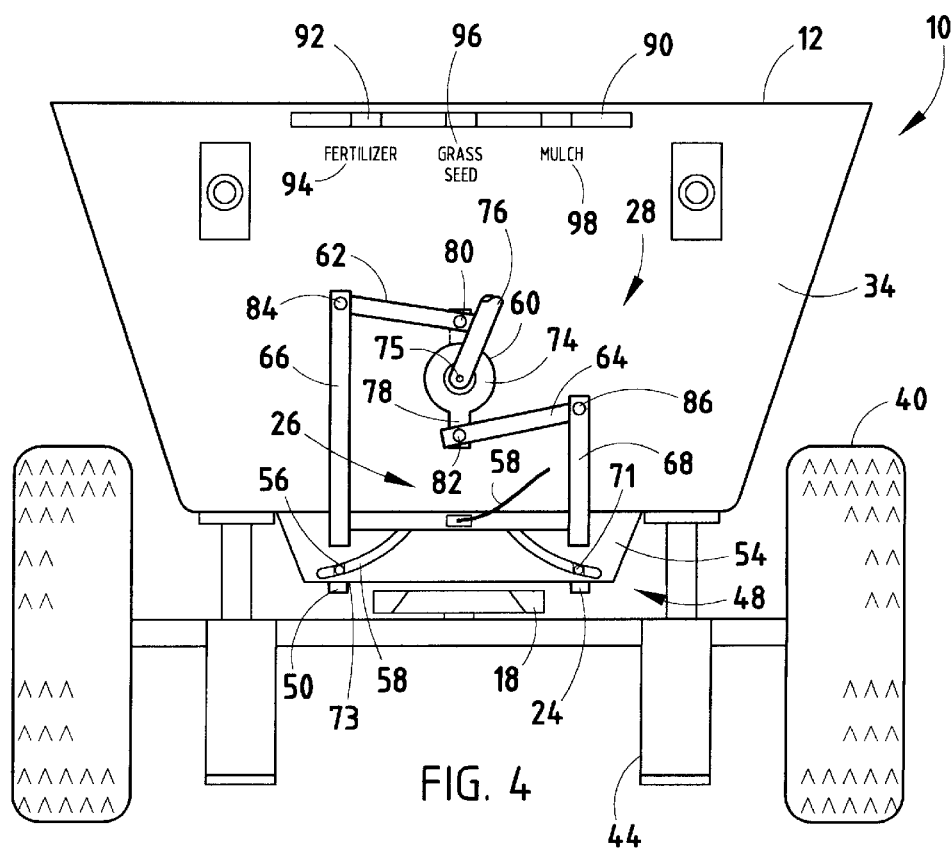
FIG. 4 is a rear elevational view of the lawn and garden spreader with a handle removed.

Blade 18, as illustrated in FIGS. 3 and 4, is situated below aperture 14 of hopper 12 such that application 20 flowing through aperture 14 will contact blade 18. Blade 18 is rotatably driven by a mechanical linkage (not shown) between blade 18 and wheel system 40 such that relative rotational motion of wheel system 40 causes blade 18 to rotate. Blade 18 is adapted to disperse and spread the application 20 flowing through aperture 14 of hopper 12 onto and about the lawn or garden.

The illustrated gate 22 (FIGS. 2 and 3) is provided with a substantially rectangular shape, however, other geometrical shapes corresponding to the size and shape of aperture 14 within hopper 12 may be employed. Gate 22 is adapted to be slidably mounted between track members 39a and 39b and within pocket 37 such that it may be shifted by the operator between the extended position (FIG. 2) wherein gate 22 closes aperture 14 thereby prohibiting the flow of the application 20 through aperture 14, and the retracted position (as illustrated by the phantom lines, FIG. 2) wherein aperture 14 is open and the application 20 is allowed to freely flow therethrough. A pair of biasing springs 46 are also located within pocket 37 of hopper 12 and are positioned so as to bias gate 22 towards the closed position. A gate stop 100 is fixedly connected to bottom wall 38 of hopper 12 and is adapted for contact with gate 22 when gate 22 is in the fully extended position.

Figure 2:
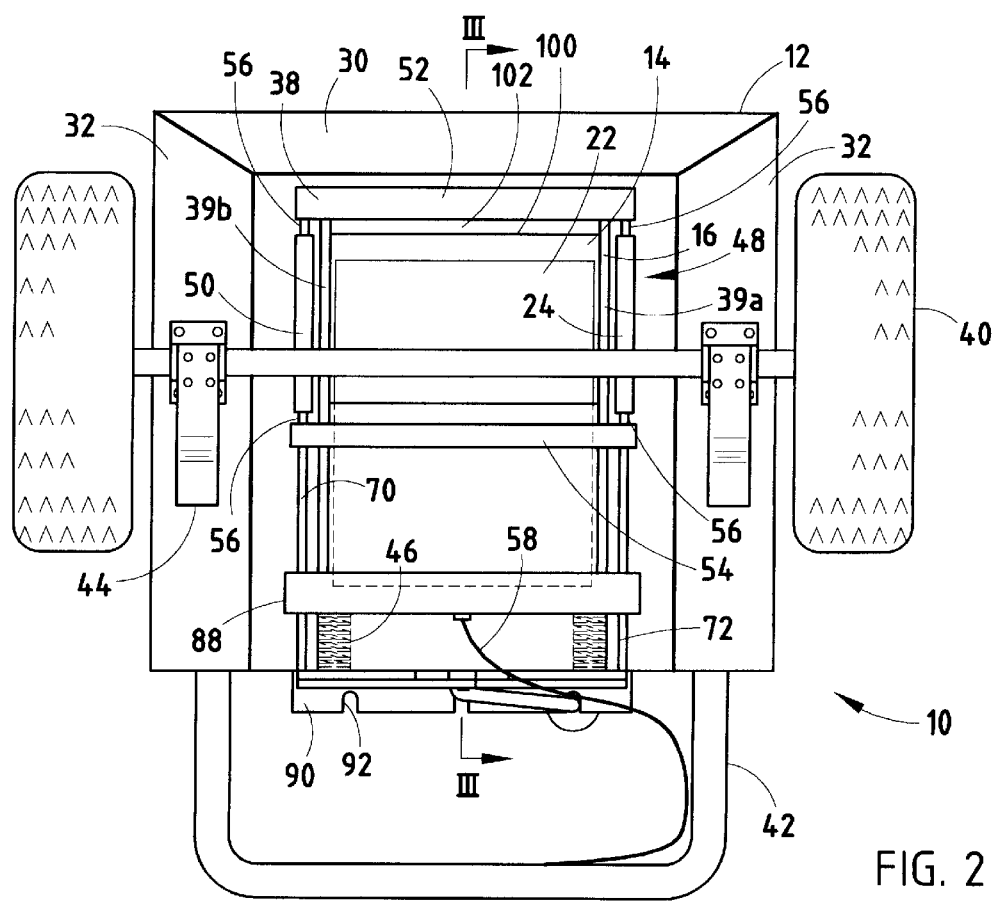
FIG. 2 is a bottom plan view of the lawn and garden spreader with a disbursement blade removed, and a guide member cut-away to show a pair of biasing springs.
Figure 5:
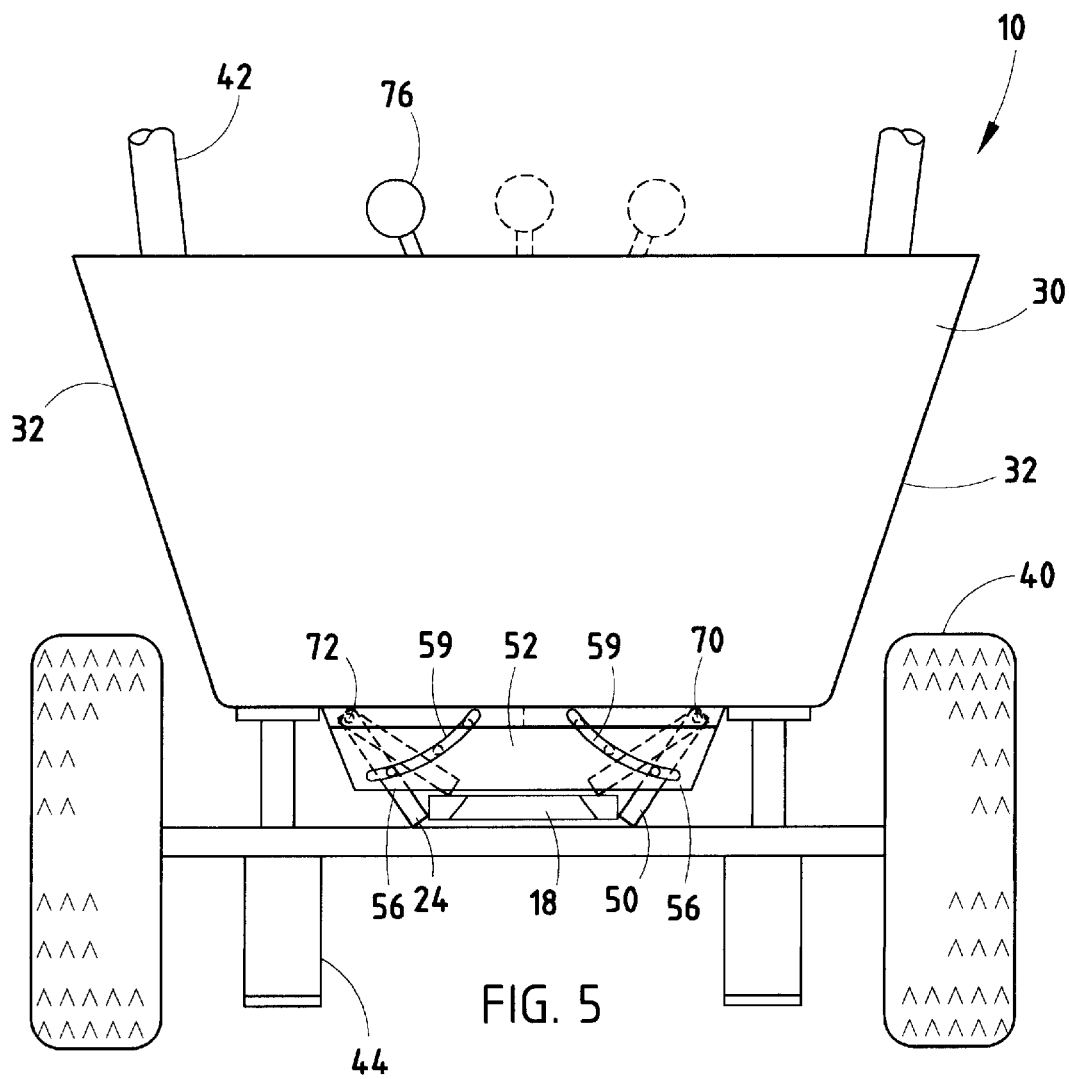
FIG. 5 is a front elevated view of the lawn and garden spreader with a door system and the handle in a plurality of positions.

Door 24, as illustrated in FIGS. 2–4, is part of a door system 48 that includes first door 24, a second door 50, a first door guide 52, and a second door guide 54. First door 24 and second door 50 are pivotally attached to bottom wall 38 of hopper 12. First door 24 and second door 50 are juxtaposed across aperture 14 of hopper 12 and are adapted to rotate between a raised position (phantom lines, FIG. 5) wherein first door 24 and second door 50 are completely closed and cover aperture 14 of hopper 12, a lowered position (FIGS. 2–4) wherein first door 24 and second door 50 are completely open allowing application 20 to freely flow through aperture 14 of hopper 12, and a plurality of intermediate positions (phantom lines, FIG. 5) between the completely closed and completely open positions wherein first door 24 and second door 50 operate in cooperation to meter the application flowing through aperture 14 from hopper 12. First door 24 and second door 50 are provided with outwardly extending guide pins 56. First guide 52 and second guide 54 are each provided with a pair of arcuate passages 59 that are adapted to receive guide pins 56 of first door 24 and second door 50 therethrough. First guide 52 and second guide 54 are futher provided with pivot rod apertures (not shown). A doorstop 102 is fixedly connected with bottom wall 38 and is adapted for contact with first door 24 and second door 50 when first door 24 and second door 50 are in the fully raised position.

The illustrated first mechanical linkage 26 (FIGS. 1–4) is in operable connection with gate 22 and includes a sliding friction lock cable 58. Cable 58 is adapted to allow the operator to shift gate 22 between an extended position wherein gate 22 closes aperture 14 and a retracted position wherein aperture 14 is open.

Second mechanical linkage 28, as illustrated, includes a bell crank 60 pivotally attached within and outwardly extending from pivot aperture 35 of outer rear wall 34, a first linkage 62, a second linkage 64, a third linkage 66, a fourth linkage 68, a first pivot rod 70, and a second pivot rod 72. Bell crank 60 is provided with a central hub 74 defining a pivot point 75 centrally located therein and adapted to operably connect with a control lever 76, and a pair of juxtaposed, outwardly extending arms 78. First linkage 62 and second linkage 64 are pivotally connected to arms 78 of bell crank 60 to form a first connection 80 and a second connection 82 there between, respectively. First linkage 62 and second linkage 64 are pivotally connected to third linkage 66 and fourth linkage 68, respectively, forming a third connection 84 and a fourth connection 86 there between, respectively.

Third linkage 66 and fourth linkage 68 are fixedly connected to first pivot rod 70 and second pivot rod 72, respectively. First pivot rod 70 defines a pivot axis point 71 and second pivot rod 72 defines a pivot axis point 73. Second mechanical linkage 28 is adapted and configured such that rotation of bell crank 60 about pivot point 75 of hub 74 causes first pivot 70 and second pivot rod 72 to pivot about pivot axis 71 and 73, respectively. First pivot rod 70 and second pivot rod 72 extend through a pivot guide 88 and pivot rod aperture 55 of second door guide 54, and are fixedly connected with first door 24 and second door 50, respectively, such that pivoting first pivot rod 70 about pivot axis 71 and second pivot rod 72 about pivot axis 73 causes first door 24 and second door 50 to rotate between the raised and lowered positions.

Control lever 76 (FIGS. 1 and 4) extends upwardly from hub 74 of bell crank 60 and is configured to be easily graspable by the operator. A rearwardly extending selection rail 90 is connected to outer rear wall 34 of hopper 12, and is provided with a plurality of notches 92 adapted to allow control lever 76 to be seated therein. Notches 92 correspond to pivotal positions of first door 24 and second door 50 (FIG. 5) such that the operator may select and control the position of first door 24 and second door 50 thereby metering the flow rate of the application 20 through aperture 14. Notches 92 of selection rail 90 are sufficiently labeled such that the operator may simply position the control level 76 within the notch 92 having a label corresponding to the application 20 in hopper 12. While the illustrated spreader 10 is provided with labels for "Fertilizer" 94, "Grass Seed" 96, and "Mulch" 98, other labels corresponding to appropriate door system 48 settings may be substituted.

In operation, the operator selects and places the appropriate application 20 within hopper 12. The operator then adjusts the positions of first door 24 and second door 50 by placing control lever 76 within the appropriate notch 92 of selection rail 90 corresponding to the application 20 in hopper 12. The operator then shifts gate 22 to the open position by way of sliding cable 58 thereby overcoming the biasing force provided by springs 46 and allowing the application 20 to flow through aperture 14 and onto blade 18. When the operation is complete, the operator simply shifts 9. gate 22 to the closed position by way of sliding cable 58 thereby halting the flow of application 20 through aperture 14.

The size of application 22 may vary significantly depending upon the project being completed. Spreader 10 is adapted to accept and effectively spread and disburse application 20 much larger than that typically associated with typical industry applications. Specifically, spreader 10 is adapted to effectively spread application 20 provided in pellet like form measuring from ¼ of an inch up to and including 1 inch in any direction, however, it should be noted that the principles disclosed herein may be employed to spread almost any lawn or garden application of varying shapes, sizes and consistencies.

Spreader 10 provides a greatly improved apparatus and method for spreading and disbursing the application 20 onto and about a given area by incorporating gate 22 and door system 48. By adapting gate 22 and door system 48 to work in cooperation, spreader 10 is able to accept and delivery application 20 having a size much greater than that normally associated with applications in the industry. In addition, control lever 76 in conjunction with selection rail 90 and the labels 94, 96 and 98 associated there with, allow the operator to simply and easily meter the flow of the application 20 through aperture 14 of hopper 10 without having to refer to outside manuals or discover the appropriate settings by trial and error.

In the foregoing description, it will be readily appreciated by those skilled in the art that modifications may be made to the invention without departing from the concepts disclosed herein. Such modifications are to be considered as included in the following claims, unless these claims by their language expressly state otherwise.

The invention claimed is as follows:

1. A method for metering and spreading lawn and garden applications, comprising:

providing a gravity flow hopper having an outlet aperture formed in a lower portion thereof and a horizontally oriented track disposed adjacent to the outlet aperture;

providing a rotatable disbursement blade situated below the aperture;

providing a gate slidably mounted in the track and shiftable between an extended position wherein the gate closes the outlet aperture and a retracted position where the outlet aperture is open;

providing a first metering door pivotably attached to the hopper for rotation between a closed position wherein the first door is raised and covers the aperture, and an open position where the first door is lowered;

providing a first mechanical linkage operably connected with the gate allowing the operator to selectively operate the gate between the extended and retracted positions;

providing a second mechanical linkage operably connected with the first door allowing the operator to selectively operate the first door between the closed and open positions and a plurality of intermediate selectable positions calibrated to provide a predetermined flow rate of an application contained in the hopper through the aperture and onto the disbursement blade;

placing the appropriate application within the hopper;

operating the gate in cooperation with the first door such that even and uninterrupted flow of the application from the hopper through the aperture is achieved; and adjusting the first door such that the application flows through the aperture and onto the disbursement blade at a specific rate.

2. The method as set forth in claim 1, further comprising:
providing a second door pivotally attached to the hopper so as to rotate in an opposite direction to the first metering door.

3. The method as set forth in claim 2, wherein:
said step of providing a track within the hopper further comprises a downwardly extending first guide attached to the hopper whereby the track is defined therebetween.

4. The method as set forth in claim 3, further comprising:
providing a second guide downwardly extending from the hopper and juxtaposed across the aperture with the first guide wherein the track is defined therebetween.

5. The method as set forth in claim 4, further comprising:
providing a first door guide attached to and downwardly extending from the hopper and having two arcuately shaped passages located therein; and
providing a first pair of outward extending guide pins fixedly attached to the first door and the second door, wherein one of the first guide pills is attached to the first door and the other of the first guide pins is attached to the second door, and wherein the pins are adapted to be received within the passages of the first door guide and track therein when the first door and the second door rotate between the raised and lowered positions.

6. The method as set forth in claim 5, further comprising:
providing a second door guide attached to and downwardly extending from said hopper and juxtaposed about the aperture of the hopper from the first door guide and having a pair of arcuately shaped passages located therein; and
providing a second pair or outwardly extending guide pins fixedly attached to the first door and the second door, wherein one of the second guide pins is attached to the first door and the other of the second guide pins is attached to the second door, whereby the second set of guide pins are adapted to be received within the passages of the second door guide and track therein when the first door and the second door rotate between the raised and lowered positions.

7. The method set forth in claim 6, further comprising:
providing a spring positioned so as to bias the gate towards the fully extended position.

8. The method as set forth in claim 7, further comprising:
providing a gate stop located such that the gate contacts the gate stop when the gate is in the fully retracted position.

9. The method as set forth in claim 6, further comprising:
providing at least one doorstop located such that at least a selected one of the first and second doors contacts the doorstop when the selected door is in the fully closed position.

10. The method as set forth in claim 9, wherein:
said step of providing the first mechanical linkage comprises providing a cable line.

11. The method as set forth in claim 10, wherein:
said step of providing the second mechanical linkage further comprises providing an adjustment lever in mechanical communication with the second mechanical linkage, accessible to the operator, and adjustable between incremental positions corresponding to the intermediate positions of at least a selected one of the first and second doors.

12. The method as set forth in claim 11, wherein:
said step of placing the application in the hopper further comprises selecting an application having a size greater than that normally associated with lawn and garden applications.

13. The method as set forth in claim 12, wherein:
said step of placing the application in said hopper further comprises selecting an application having a pellet-like shape and measuring from ¼ inch up to 1 inch in any direction.

14. The method as set forth in claim 1, further comprising:
providing an adjustment lever in mechanical communication with the second mechanical linkage, accessible to the operator, and adjustable between incremental positions corresponding to the intermediate positions of at least a selected one of the first and second doors.

15. The method as set forth in claim 14, wherein:
said step of placing the application in the hopper further comprises selecting an application having a size greater than that normally associated with lawn and garden applications.

16. The method as set forth in claim 15, wherein;
said step of placing the application in the hopper further comprises selecting an application having a pellet-like shape and having an approximate ¼ inch diameter and ⁵⁄₁₆ inch length.

17. In a lawn and garden spreader, the improvement comprising:
a gravity flow hopper having an outlet aperture in a lower portion thereof and a horizontally oriented track disposed adjacent to said outlet aperture;
a rotatable disbursement blade situated below said outlet aperture;
a gate slidably mounted in said track, and shiftable between an extended position wherein said gate closes said outlet aperture and a retracted position wherein said outlet aperture is open;
a first metering door pivotably attached to said hopper for rotation between a closed position wherein said first door is raised and covers said aperture, and an open position where said first door is lowered and meters flow from said hopper to said disbursement blade, and
at least one mechanical linkage operably connected with at least one of said gate and said first door allowing the operator to selectively operate said gate between the extended and retracted positions and said first door between the closed and open positions.

18. The lawn and garden spreader as described in claim 17, wherein:
said first door is operable between a plurality of selectable positions calibrated to provide a predetermined flow rate of an the application contained in said hopper through said aperture and onto said disbursement blade.

19. The lawn and garden spreader as described in claim 18, wherein:
a second door is attached to said hopper for rotation between a closed position wherein said second door is raised and covers said aperture, and an open position where said second door is lowered, said second door attached to said hopper so as to rotate in an opposite direction from said first door, said second door operable between a plurality of selectable position to operate in cooperation with said first door, the rotation of said first door and said second door calibrated to provide a predetermined flow rate of the application contained in said hopper through said aperture and onto said disbursement blade.

20. The lawn and garden spreader as described in claim 19, further comprising:
a first gate guide attached to said lower portion of said hopper thereby defining said track therebetween.

21. The lawn and garden spreader as described in claim 20, further comprising:
a second gate guide downwardly extending from said lower portion of said hopper and defining said track therebetween, said second gate guide juxtaposed with said first guide about said aperture.

22. The lawn and garden spreader as described in claim 21, further comprising:
a first door guide attached to and downwardly extending from said hopper and having two arcuately shaped passages located therein; and
a pair of outward extending guide pins fixedly attached to said first door and said second door, said pins adapted to be received within said passages of said first door guide and track therein when said first door and said second door are rotated between the raised and lowered positions.

23. The lawn and garden spreader as described in claim 22, further comprising:
a second door guide attached to and downwardly extending from said hopper, said second door guide juxtaposed about said aperture of said hopper from said first door guide, said second door guide having a pair of arcuately shaped passages located therein; and
a second pair of outwardly extending guide pins fixedly attached to said first door and said second door, said second set of guide pins adapted to be received within said passages of said second door guide and track therein when said first door and said second door are rotated between the raised and lowered positions.

24. The lawn and garden spreader as described in claim 23, further comprising:
at least one spring biasing said gate towards the extended position.

25. The lawn and garden spreader as described in claim 24, further comprising:
a gate stop located such that said gate contacts said gate stop when said gate is in the fully retracted position.

26. The lawn and garden spreader as described in claim 25, further comprising:
at least one doorstop located such that said first door and said second door contact said doorstop when said first door and said second door are in the fully closed position.

27. The lawn and garden spreader as described in claim 26, wherein:
said at least one mechanical linkage comprises a first mechanical linkage and a second mechanical linkage, said first mechanical linkage operably connected with said gate, and said second mechanical linkage operably connected with said first door and said second door.

28. The lawn and garden spreader as described in claim 27, wherein:
said first mechanical linkage is a cable line.

29. The lawn and garden spreader as described in claim 28, wherein:
said second mechanical linkage is operably connected to an operating lever.

30. The lawn and garden spreader as described in claim 29, wherein:
said lever is adjustable between incremental positions corresponding to the selectable positions of said first door and said second door whereby an operator may easily adjust said first door and said second door to correspond with the type of the application in said hopper.

31. The lawn and garden spreader as described in claim 30, wherein:
said aperture of said hopper is adapted to allow uninterrupted and constant flow of the application located in said hopper wherein the application has a pellet-like shape and measures from substantially ¼ of an inch up to and including 1 inch in any direction.

32. The lawn and garden spreader as described in claim 1, wherein:
said aperture of said hopper is adapted to allow uninterrupted and constant flow of an application located in said hopper wherein the application has a pellet-like shape and measures from substantially ¼ of an inch up to and including 1 inch in any direction.

* * * * *